(12) United States Patent
Takahashi et al.

(10) Patent No.: US 7,394,550 B2
(45) Date of Patent: Jul. 1, 2008

(54) DISPLACEMENT DETECTOR

(75) Inventors: Tomotaka Takahashi, Kawasaki (JP);
Shingo Nihommori, Himeji (JP)

(73) Assignee: Mitutoyo Corporation, Kawasaki-shi (JP)

( * ) Notice: Subject to any disclaimer, the term of this patent is extended or adjusted under 35 U.S.C. 154(b) by 207 days.

(21) Appl. No.: 11/313,082

(22) Filed: Dec. 20, 2005

(65) Prior Publication Data
US 2006/0139654 A1 Jun. 29, 2006

(30) Foreign Application Priority Data
Dec. 24, 2004 (JP) ............................. 2004-373411

(51) Int. Cl.
*G01B 11/02* (2006.01)
*G01D 5/36* (2006.01)
(52) U.S. Cl. .................. 356/499; 356/521; 250/237 G
(58) Field of Classification Search ............... 356/499, 356/521; 250/237 G
See application file for complete search history.

(56) References Cited
U.S. PATENT DOCUMENTS

| 5,000,542 A * | 3/1991 | Nishimura et al. ......... 359/437 |
| 5,066,130 A * | 11/1991 | Tsukiji et al. ............ 356/494 |
| 5,104,225 A * | 4/1992 | Masreliez ................ 356/494 |
| 5,146,085 A * | 9/1992 | Ishizuka et al. ......... 250/231.16 |
| 5,517,307 A * | 5/1996 | Buehring et al. .......... 356/494 |
| 6,744,520 B2 * | 6/2004 | Chang et al. ............. 356/499 |
| 6,771,377 B2 * | 8/2004 | Jones et al. ............. 356/616 |
| 7,187,451 B2 * | 3/2007 | Kao et al. ............... 356/499 |

FOREIGN PATENT DOCUMENTS

| EP | 0311144 | 4/1989 |
| EP | 0620418 | 10/1994 |
| EP | 1359389 | 11/2003 |
| JP | 04-270920 | 9/1992 |

* cited by examiner

*Primary Examiner*—Patrick Connolly
*Assistant Examiner*—Jonathan Skovholt
(74) *Attorney, Agent, or Firm*—Rankin, Hill & Clark LLP

(57) ABSTRACT

The displacement detector includes: a light source 140; a beam splitter 170 for dividing the light, which is sent from the light source 140, into two beams of light; reflection mirrors 181, 182 provided for the two beams of light sent from the beam splitter 170, for reflecting these two beams of light and making them incident upon a scale 110; and corner cubes 191, 192 provided for the beams of diffracted light, which are generated when two beams of light incident upon the scale 110 are diffracted by the diffraction grating 111, wherein the corner cubes 191, 192 retroreflect the diffracted light and make the light incident upon the scale as retroreflected light. The incident angle to grating groove formed between the incident light and the normal line vector of the scale is larger than the diffraction angle formed between the retroreflected light and the normal line vector of the scale.

5 Claims, 13 Drawing Sheets

DISPLACEMENT DETECTOR

The present application claims foreign priority based on Japanese Patent Application No. 2004-373411, filed Dec. 24, 2004, the content of which is incorporated herein by reference.

BACKGROUND OF THE INVENTION

1. Technical Field

The present invention relates to a displacement detector. For example, the present invention relates to a laser beam interference type displacement detector.

2. Related Art

A laser beam interference type displacement detector has been known (For example, See JP-A-4-270920). As shown in FIG. 11, the related-art laser beam interference type displacement detector 200 includes: a scale 210; and a detection head portion 220 capable of relatively moving in the length measuring direction of this scale 210, for detecting a displacement with respect to the scale 210.

The scale 210 has a reflection type diffraction grating 211 arranged in the longitudinal direction which is the length measuring direction. The detecting head portion 220 includes a light emitting and receiving portion 230 and an optical device unit portion 260.

The light emitting and receiving portion 230 includes: a light source 240 for emitting a laser beam (L31); and a light receiving portion 250 for receiving interference light which has been reflected and diffracted by the scale 210.

The optical device unit portion 260 includes: a beam splitter 270; a first mirror 281; a second mirror 282; a first corner cube 291; and a second corner cube 292. The beam splitter 270 divides light (L31) sent from the light source 240. The first mirror 281 reflects (L34) one beam of light (L32), which has been divided by the beam splitter 270, to the scale 210. The second mirror 282 reflects (L35) the other beam of light (L33), which has been divided by the beam splitter 270, to the scale 210. The first corner cube 291 retroreflects (L38) one beam of reflected and diffracted light (L36), which is sent from the scale 210, to the scale 210. The second corner cube 292 retroreflects (L39) the other beam of reflected and diffracted light (L37), which is sent from the scale 210, to the scale 210.

For the explanations made later, the terminology is defined as follows. The direction of length measuring of the scale 210 is the x-axis direction, the direction of the diffraction grating groove is the y-axis, and the direction of the normal line of the scale 210 is the z-axis direction as shown in FIG. 12.

In this case, in order to make the displacement detector 200 compact, the light emitting and receiving portion 230, the first mirror 281 and the second mirror 282 are arranged on one side of the center line (x-axis) along the length measuring direction of the scale 210, and the first and the second corner cube 291, 292 are arranged on the other side.

That is, beams of light incident upon the scale 210 via the first mirror 281 and the second mirror 282 are obliquely incident with respect to the diffraction grating grooves. In other words, a so-called conical diffraction is composed.

In this structure, light L31 emitted from the light source 240 is divided by the beam splitter 270 (L32 and L33 in FIG. 11). Then, the thus divided beams of light are reflected by the first and second mirrors 281,282 (L34 and L35 in FIG. 11) and then incident upon the scale 210 and reflected and diffracted. The beams of reflected and diffracted light (L36 and L37 in FIG. 11) sent from the scale 210 are retroreflected by the first and the second corner cubes 291, 292 (L38 and L39 in FIG. 11) and reflected and diffracted again by the scale 210 (L40 and L41). These beams of reflected and diffracted light L40, L41 are reflected on the first and the second mirror 281, 282 (L42, L43) and synthesized by the beam splitter 270 and received by the light receiving portion 250.

When a light receiving signal outputted from the light receiving portion 250 is processed by a predetermined signal processing procedure, a relative displacement between the scale 210 and the detecting head portion 220 is detected.

When the reflected and diffracted light sent from the scale 210 is retroreflected as described above, the four times multiplied optical signal can be obtained, and the resolving power can be enhanced.

However, the above structure is a so-called conical diffraction in which beams of light (L34, L35) incident upon the scale 210 are obliquely incident with respect to the direction of the diffraction grating groove and beams of diffracted light (L36, L37) are obliquely incident with respect to the direction of the diffraction grating groove.

In this case, in general, the condition of conical diffraction can be expressed by the following expression.

$$\beta P \cdot \cos \epsilon \cdot (\sin \alpha \pm \sin \beta) = m \cdot \lambda$$

$$\beta = \sin^{-1}\{(m\lambda/\cos \epsilon \cdot P) - \sin \alpha\} \quad \text{[Expression 1]}$$

In this case, λ is a wave-length of light (for example, 635 nm), m is a degree of the diffraction, and P is a pitch of the grating. The angle α formed between the incident light (L34), which is projected on the x-z face, and the normal line, the angle β formed between the diffracted light (L36), which is projected on x-z plane, and the normal line, and the angle (conical angle) ε formed between the incident light (L34) and the x-z plane are shown in FIG. 12.

According to the above expression, in the case where a relative posture between the scale 210 and the detection head portion 220 is changed when the scale 210 yaws round the vertical axis (z-axis) or the scale 210 rolls round the x-axis, the incident angle α and the conical angle ε are changed. Therefore, the diffraction angle β is changed.

FIG. 13 is a view showing an optical path in the case where the scale 210 yaws. FIG. 13 also shows a portion of the structure of the displacement detector 200.

As shown in FIG. 13, when the diffraction angle β of the diffracted light L37, which is generated when the incident light L35 sent from the second reflection mirror 282 is diffracted, is shifted, the optical path of light is shifted. Therefore, the recursive optical length (L37+L39) fluctuates and the positional information deviates. When a position at which the retroreflected and diffracted light is incident upon the beam splitter is shifted (that is, when a position at which L43 is incident upon the beam splitter 270 is shifted) an intensity of the interference signal is decreased and the detection accuracy is lowered.

SUMMARY OF THE INVENTION

An object of the present invention is to provide a displacement detector which has a robust property with respect to a relative posture change between the scale and the detection head portion; a high resolving power; and which can stably detect displacement.

The present invention provides a displacement detector comprising: a scale having a diffraction grating; and a detection head, which is arranged being capable of relatively moving with respect to the scale, emitting interference light to the scale and receiving diffracted light sent from the scale, the detection head including: a light source emitting interference light; a light dividing section for dividing light, which has been sent from the light source, into two beams of light; an optical element, which is arranged for each of the two beams of light sent from the light dividing section, for reflecting the beam of light sent from the light dividing section and making the beam of light be incident upon the scale as incident light; and a retroreflector, which is arranged for each of the beams of diffracted light generated when the two beams of light incident upon the scale are diffracted by the diffraction grating, for retroreflecting the diffracted light and making the light be incident upon the scale as retroreflected light, wherein the incident light and the retroreflected light are incident in a direction perpendicular to the diffraction grating groove, and an angle formed between the incident light and the normal line vector of the scale is larger than an angle formed between the retroreflected light and the normal line vector of the scale.

In this structure, the detection head portion emits interference light to the scale. This light is diffracted by the diffraction grating of the scale. The thus diffracted light is received by the detection head portion. From this light receiving signal, a relative displacement between the scale and the detection head portion can be detected.

At this time, the light emitted from the light source is divided by the light dividing section into two beams of light. These beams of light are respectively diffracted by the diffraction grating of the scale. Then, each beam of diffracted light is returned to the scale by the retroreflector as retroreflected light. The retroreflected light is diffracted again by the scale. Beams of light generated when the retroreflected light is diffracted by the diffraction grating are synthesized and the interference light is received by the detection head portion. Due to the foregoing, an interference signal optically multiplied by four times is received, and a relative displacement between the scale and the detection head portion can be detected by a high resolving power.

In this case, the incident light and the retroreflected light are incident upon the scale in the direction perpendicular to the diffraction grating groove. Therefore, for example, compared with the case of conical diffraction, it is possible to reduce a change of the diffracted light in the incident direction caused by the yawing of the scale. As a result, it is possible to reduce a change of the optical path length of each of the two beams of light caused by the yawing of the scale. Therefore, for example, the detection accuracy can be stabilized with respect to the yawing of the scale.

Further, when a change of the diffracted light in the incident direction caused by the yawing of the scale is reduced, it is possible to accurately synthesize two interference beams of light. Therefore, the signal efficiency of the interference light can be ensured and the detection accuracy can be maintained high.

When the incident light and the retroreflected light are incident in the perpendicular direction to the diffraction grating groove, the diffraction efficiency can be enhanced as compared with the case of conical diffraction. Then, a quantity of the interference light to be received can be increased. Therefore, the detection accuracy can be enhanced.

Since the incident angle of the incident light is increased so that the incident angle (the angle formed between the incident light and the normal line vector of the scale) of the incident light can be larger than the incident angle of the retroreflected light, it is possible to reduce a change in the diffraction angle caused by the yawing of the scale. This matter will be described in detail later. That is, a change in the optical path length of each of the two beams of light caused by the yawing of the scale is reduced, the detection accuracy can be stabilized with respect to the yawing of the scale.

As described above, when a change of the diffracted light in the incident direction with respect to the change in the relative posture of the scale and the detection head portion caused by the yawing of the scale is suppressed, the detection accuracy can be stabilized, and a relative displacement between the scale and the detection head can be accurately detected.

In this connection, the diffraction grating of the scale may be either the transmission type diffraction grating or the reflection type diffraction grating.

In the present invention, the scale includes a reflection type diffraction grating, the optical element and the retroreflector are arranged on a face perpendicular to the diffraction grating groove, and the optical element is arranged on a closer side to the scale than the retroreflector.

In this structure, since the reflection type diffraction grating is used, the optical element and the retroreflector must be arranged on the reflection face side of the scale. However, when the optical element is arranged on the scale side and the retroreflector is arranged on the side separate from the scale, both the optical element and the retroreflector can be arranged on the reflection face side of the scale without causing any problems.

When the optical element is arranged on the scale side, it is possible to increase the incident angle of the incident light. As a result, a change in the diffraction angle caused by the yawing of the scale can be reduced. Then, a change in the length of the optical path of each of two beams of light is reduced. Therefore, the detection accuracy can be stabilized with respect to the yawing of the scale.

Since the optical element and the retroreflector are arranged on a face perpendicular to the diffraction grating groove, the optical element and the retroreflector are arranged on the same face. Accordingly, the width of the detection head portion can be reduced. Therefore, for example, the width of detection head portion can be accommodated in the width of the scale. As a result, the displacement detector can be made thin and compact.

In this case, the optical element is arranged on the side closer to the scale than the retroreflector. This means that a distance from the scale to the optical element is shorter than a distance from the scale to the retroreflector.

In this connection, since it is desirable that the length of the optical path of the retroreflected light is as short as possible, the retroreflector may be arranged as close as possible to the scale. In this case, of course, the retroreflector may be arranged closer to the scale than the reflection mirror. However, since it is necessary to increase the incident angle of the incident light for suppressing a change in the diffraction angle caused by the yawing of the scale, when the optical element is arranged on the scale side, the components can be easily laid out.

In the present invention, the light dividing section is a polarization beam splitter, one portion of the incident light, which is polarized by 45° with respect to the polarizing direction of the polarization beam splitter, is transmitted through the polarization beam splitter, another portion of the incident light is reflected by the polarization beam splitter so that the light is divided into two beams of light respectively having the polarizing directions which are perpendicular to each other. The detection head portion includes a phase retardation plate on which under the condition that the polarizing direction of the light emitted from the light source and reflected on the polarization beam splitter is rotated, the light is incident upon the reflection type diffraction grating and the polarizing direction of the light, which is obtained when this incident light is reflected and diffracted by the reflection type diffraction grating, is rotated again so that the light can be made into polarization light substantially perpendicular to the polarizing direction of the polarization beam splitter. The reflection type diffraction grating is preferably composed of a thin metallic film having a polarization characteristic in which incident light is reflected and diffracted under the condition that the polarizing direction is maintained.

In this structure, light sent from the light source is incident upon the polarization beam splitter being polarized by 45° with respect to the polarization direction of the polarization beam splitter.

Then, the light is divided into two beams of light. One is a beam of light, the polarizing direction of which is parallel with the polarizing direction of the polarization beam splitter. This beam of light will be referred to as P-wave hereinafter. The other is a beam of light, the polarizing direction of which is perpendicular to the polarizing direction of the polarization beam splitter. This beam of light will be referred to as S-wave hereinafter.

The thus divided S-wave becomes, for example, P-wave when the polarizing direction is rotated by the phase retardation plate.

The thus divided two beams of light are incident upon the reflection type diffraction grating and reflected and diffracted. However, since the reflection type diffraction grating is composed of a metallic film having a polarization characteristic, while the polarizing direction is being maintained, the two beams of light are reflected and diffracted, that is, the two beams of light are reflected and diffracted while they are being maintained in the state of P-wave.

One of the beams of light reflected and diffracted by the reflection type diffraction grating is incident upon the polarization beam splitter while it is being maintained in the state of P-wave, and the polarizing direction of the other beam of light is rotated by the phase retardation plate and the beam of light becomes a beam of polarization light making a right angle with respect to the polarizing direction of the polarization beam splitter and is incident upon the polarization beam splitter.

Then, one beam of light is transmitted through the polarization beam splitter as it is, and the other beam of light is reflected by the polarization beam splitter. Therefore, the two beams of light proceed in same direction.

As described above, the two beams of light, which are divided by the polarization beam splitter and reflected and diffracted by the reflection type diffraction grating, finally proceed in the same direction. Accordingly, the efficiency of the use of light is high, and an intensity of receiving the interference light can be enhanced. Therefore, the detection accuracy can be enhanced at the maximum.

In this case, examples of the metallic thin film composing the reflection type diffraction grating are aluminum, chrome and gold.

In the present invention, it is preferable that the detection head portion includes a glass member arranged on the reflection face side of the reflection type diffraction grating.

In this structure, the glass member is provided on the reflection face side of the reflection diffraction grating, and only the polarized light satisfying the Brewster's angle is transmitted through the glass member. Therefore, the polarizing directions of light incident upon the reflection diffraction grating can be highly accurately made to be the same.

DETAILED DESCRIPTION OF THE INVENTION

Figure 1:
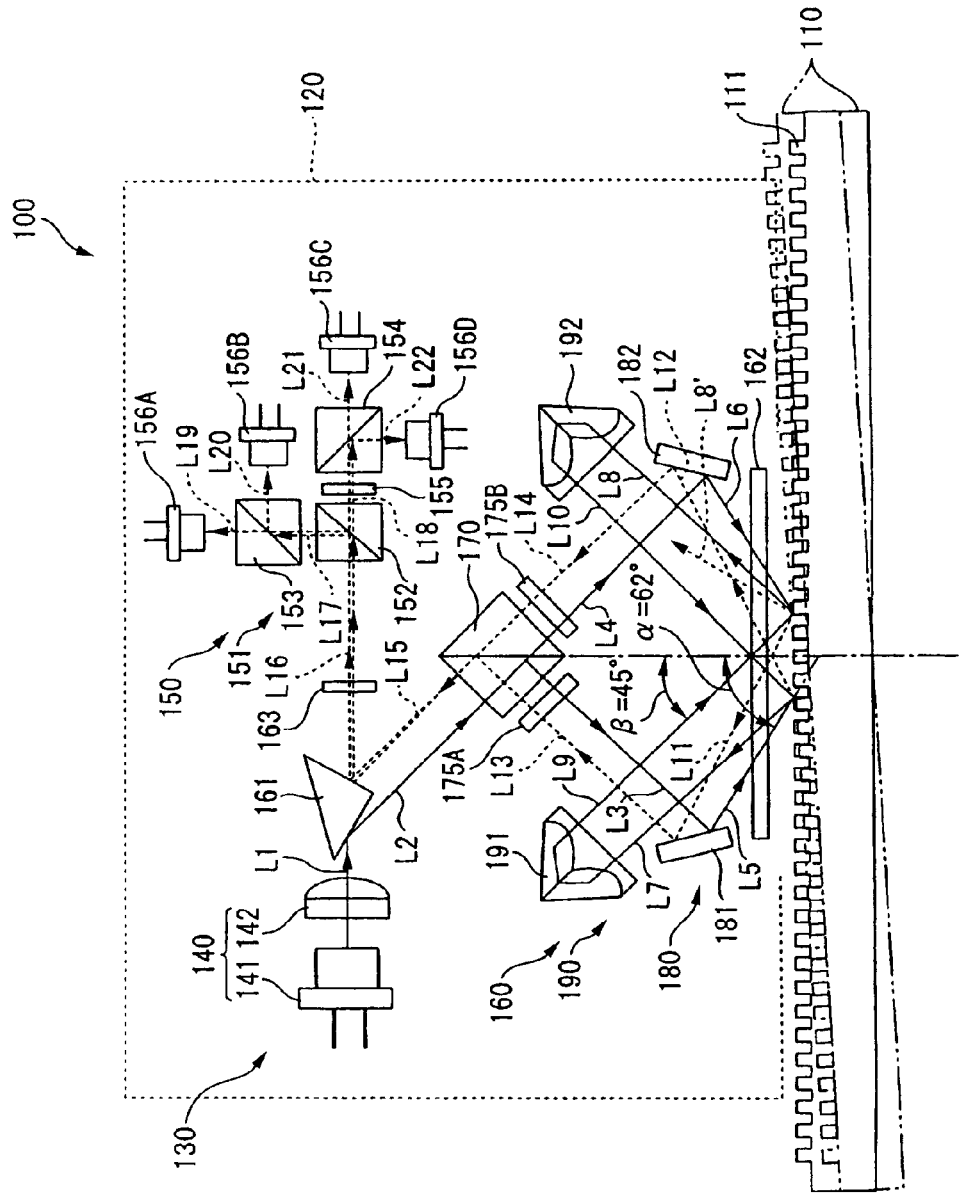
FIG. 1 is an arrangement view of the first embodiment of the displacement detector of the present invention.

An embodiment of the present invention will be shown in the drawings and explained below referring to the reference numerals attached to the components in the drawings.

First Embodiment

The first embodiment of the displacement detector of the present invention will be explained below.

FIG. 1 is a view showing an arrangement of the first embodiment of the displacement detector of the present invention.

The displacement detector 100 includes a scale 110 and a detection head portion 120.

The scale 110 is horizontally arranged so that it can slide in the longitudinal direction which is a length measuring direction. In this case, for the convenience of explanations, the longitudinal direction (the length measuring direction) of the scale 110 is defined as x-axis, the normal line direction of the scale 110 is defined as z-axis, and the lateral direction (the direction perpendicular to the surface of FIG. 1) of the scale 110 is defined as y-axis.

The reflection type diffraction grating 111 is arranged in the longitudinal direction (the direction of x-axis) on the face of the scale 110 opposed to the detection head portion 120.

A metallic thin film having the polarization characteristic is vapor-deposited on the surface of the diffraction grating 111. Therefore, under the condition that the polarizing direction of the incident light is maintained as it is, light is reflected and diffracted by the surface of the diffraction grating 111. In this connection, examples of the metallic thin film are aluminum, chrome and gold.

Pitch P of the diffraction grating 111 is a grating period satisfying the Bragg's diffraction condition. In the case where the wave length of light to be used is in the range from the visible region to the near infrared region, an example of the grating pitch is 0.4 μm to 1.0 μm. The diffraction grating 111 satisfying the above Bragg's diffraction condition exhibits a high diffraction efficiency with respect to the polarization light (This polarization light will be referred to as P-wave hereinafter.), the yawing direction of which is on the x-z face.

The detection head portion 120 includes a light emitting and receiving section 130 and an optical device unit portion 160.

The light emitting and receiving section 130 includes: a light source portion 140; and a light receiving portion 150. The light source portion 140 emits a laser beam (interference light) L1 to the scale 110 via the optical device unit portion 160. The light receiving portion 150 receives light L15 which is diffracted by the diffraction grating 111 of the scale 110 and synthesized by the optical device unit portion 160.

The light source portion 140 includes: a light source 141 which is a laser diode; and a lens 142. A light emitting direction of the light source 140 is parallel with the length measuring direction of the scale 110, that is, a light emitting direction of the light source 140 is horizontal. Light (L1) emitted from the light source 140 is 45°-polarization light.

Light (L1) emitted from the laser light source 141 is interference light in the range from the visible region to the near infrared region. For example, an example of light (L1) emitted from the laser light source 141 is an infra red laser beam, the wave length of which is in the neighborhood of 650 nm.

The light receiving portion 150 includes: a wave dividing portion 151 for dividing light (L15), which was diffracted by the diffraction grating 111 and then synthesized by the optical device unit portion 160, into four optical waves (L19 to L22); and four photo diodes 156A to 156D for receiving the four divided beams of light (L19 to L22).

The wave dividing portion 151 includes: a non-polarization beam splitter 152; a polarization beam splitter 153; a polarization beam splitter 154; and a phase retardation plate 155. The non-polarization beam splitter 152 divides the light (L15), which was synthesized by the optical device unit portion 160, into two beams of light (L17, L18). The polarization beam splitter 153 further divides one beam of light (L17), which is sent from the non-polarization beam splitter 152, into two beams of light (L19, L20). The polarization beam splitter 154 further divides the other beam of light (L18), which is sent from the non-polarization beam splitter 152, into two beams of light (L21, L22). The phase retardation plate 155 is arranged between the non-polarization beam splitter 152 and the polarization beam splitter 154.

This phase retardation plate 155 makes a phase difference of 90° between the two beams of light (L17, L18) which are divided by the non-polarization beam splitter 152.

The photo diode includes: a photo diode 156A; a photo diode 156B; a photo diode 156C; and a photo diode 156D. The photo diode 156A receives one beam of light (L19) divided by the polarization beam splitter 153. The photo diode 156B receives the other beam of light (L20) divided by the polarization beam splitter 153. The photo diode 156C receives one beam of light (L21) divided by the polarization beam splitter 154. The photo diode 156D receives the other beam of light (L22) divided by the polarization beam splitter 154.

The optical device unit portion 160 is arranged between the light emitting and receiving portion 130 and the scale 110 and fixed with respect to the light emitting and receiving portion 130. The optical device unit portion 160 is relatively moved with respect to the scale 110 integrally with the light emitting and receiving portion 130.

The optical device unit portion 160 includes: a light guide mirror 161; a polarization beam splitter (light dividing section) 170; two phase plates 175A, 175B; a reflection mirror portion 180; a retroreflecton portion 190; a cover glass member 162; and a ½ wave length plate 163.

Concerning the overall arrangement, the wave guide mirror 161, the beam splitter 170, the reflection mirror portion 180 and the retroreflecton portion 190 are arranged on the vertical face (xz face) along the longitudinal direction of the scale 110.

The wave guide mirror 161 is a triangle-pole-shaped prism and reflects (L2) the light (L1), which was horizontally emitted from the light source portion 140, obliquely by 45° downward and reflects the reflected and diffracted light (L15), which was sent from the scale 110, and guides the light to the light receiving portion 150.

Only P-wave is transmitted through the polarization beam splitter 170. Then, the polarization beam splitter 170 divides the laser beam (L1), which was sent from the light source portion 140, into two beams of light (L3, L4). When the laser beam (L1) sent from the light source portion 140 is incident upon the polarization beam splitter 170 by the 45°-polarization, it is divided into S-wave (light L3 in the direction of −x) reflected by the polarization beam splitter 170 and P-wave (light L4 in the direction of +x) which is transmitted through the beam splitter 170.

Concerning the two phase plates, there are provided a ½ wave length plate 175A and a transparent medium 175B having the same refraction factor as that of the ½ wave length plate 175A for making the optical path lengths of two beams of light coincide with each other. The ½ wave length plate 175A rotates S-wave reflected by the polarization beam splitter 170 to make P-wave (L3). Further, the ½ wave length plate 175A rotates the reflected and diffracted light (P-wave) L13, which was sent from the scale 110, to make S-wave.

The reflection mirror portion 180 includes: a first mirror (optical element) 181 for reflecting (L5) one beam of light (light L3 in the direction of −x), which was divided by the polarization beam splitter 170, to the scale 110; and a second mirror (optical element) 182 for reflecting (L6) the other beam of light (light L4 in the direction of +x), which was divided by the polarization beam splitter 170, to the scale 110.

Beams of light (L5, L6) reflected by the first mirror 181 and the second mirror 182 are incident upon the same point on the scale 110. However, in FIG. 1, the points are illustrated being a little displaced for the convenience of explanations.

In this embodiment, the arrangement angles of the first mirror 181 and the second mirror 182 are adjusted so that the incident angle α, at which beams of light (L5, L6) reflected by the first mirror 181 and the second mirror 182 under the condition that the wave length λ and the grating period P satisfy the expression $\lambda \approx 1.59P$ are incident upon the scale 110, can be 62°.

The retroreflection portion 190 includes: a first corner cube (retroreflector) 191; and a second corner cube (retroreflector) 192. The first corner cube (retroreflector) 191 retroreflects (L9) the diffracted light (L7) in which the incident light (L5) sent from the first mirror 181 is reflected and diffracted by the scale 110. The second corner cube retroreflector 192 retroreflects (L10) the diffracted light (L8) in which the incident light (L6) sent from the second mirror 182 is reflected and diffracted by the scale 110.

The first corner cube 191 and the second corner cube 192 are located at positions more separate from the scale 110 than the first mirror 181 and the second mirror 182. These positions are more separate from the scale 110 than the lines respectively connecting the polarization beam splitter 170 with the first mirror 181 and the second mirror 182.

Beams of incident light (L5, L6) incident upon the scale 110 from the first mirror 181 and the second mirror 182 are diffracted by the diffraction grating 111 and beams of diffracted light are generated. The first corner cube 191 and the second corner cube 192 are arranged so that the beams of diffracted light of −1 degree (L7, L8) in these beams of diffracted light can be retroreflected (L9, L10).

Inside the first corner cube 191 and the second corner cube 192, a metallic film having the polarizing characteristic is vapor-deposited, for example, a metallic film made of silver or aluminum is vapor-deposited. Therefore, the polarizing direction of the retroreflected light sent from the first corner cube 191 and the second corner cube 192 agrees with the polarizing direction of the incident light.

In this connection, in this embodiment, an incident angle of the diffracted light (L7, L8) of the degree of −1 is 45°. That is, the incident angle β of the retroreflected light (L9, L10), which is retroreflected from the first corner cube 191 and the second corner cube 192, is 45°. That is, the incident angle α of the incident light (L5, L6) incident upon the scale 110 from the first and the second reflection mirror 181, 182 is larger than the angle β of the retroreflected light (L9, L10) retroreflected from the first and the second corner cube 191, 192 to the scale 110.

Figure 2:
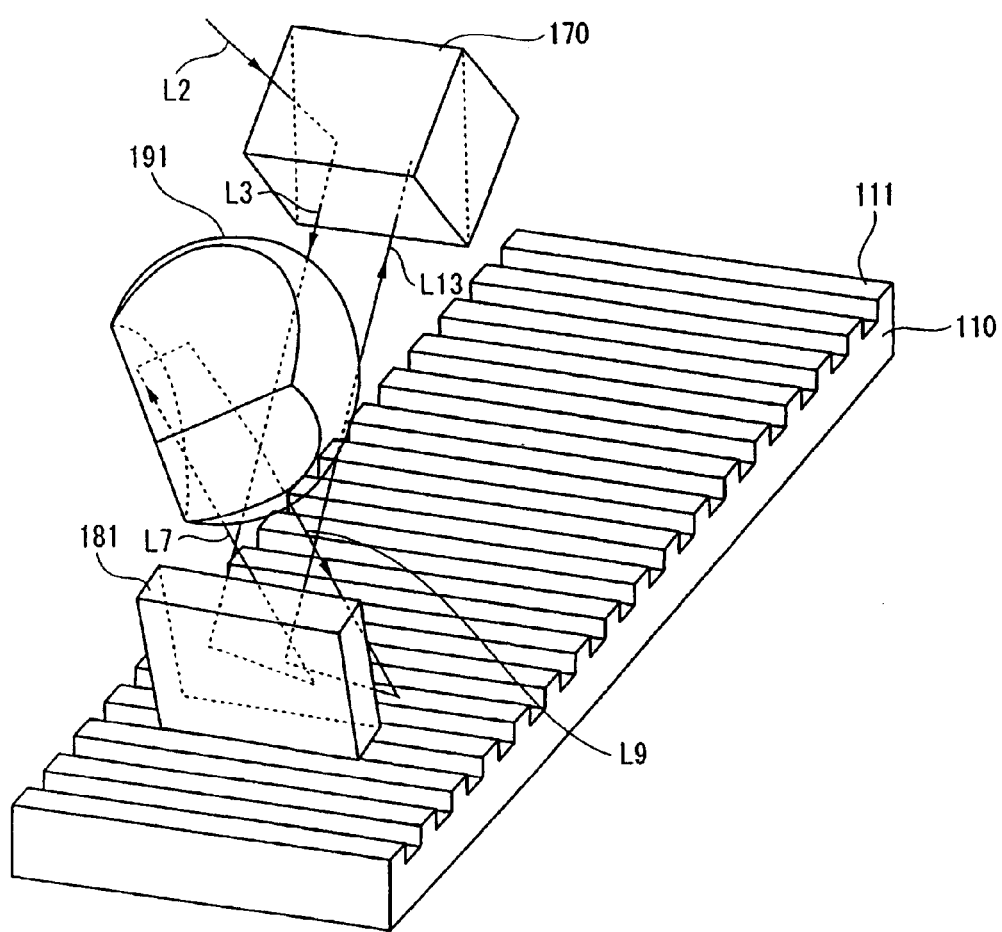
FIG. 2 is a partial perspective view of the first embodiment.

FIG. 2 is a perspective view showing a portion of the first embodiment. As shown in FIG. 2, when the light (L9) is retroreflected from the corner cube (191, 192), the optical path of the retroreflected light (L9) is shifted in the lateral direction (y-direction) of the scale 110 with respect to the diffracted light (L7) of the degree of −1. In this connection, the cover glass member is omitted in FIG. 2 for the convenience of explanations.

The cover glass member 162 is arranged at the Brewster's angle with respect to the incident light (L5, L6). Only when P-wave is transmitted through the cover glass member 162, the cover glass member 162 functions as the Brewster window.

The ½ wave-length plate 163 rotates the polarizing direction of the light, which has passed through the polarization beam splitter 170 and has been reflected on the wave guide mirror 161, by 45°, and makes the light (L16) be incident upon the light receiving portion 150.

Brief explanations will be made into the optical path in which the light emitted from the light source portion 140 is received by the light receiving portion 150 in this structure.

The laser beam L1 emitted from the light source portion 140 is reflected (L2) on the wave guide mirror 161 and then divided (L3, L4) by the polarization beam splitter 170 and reflected on the first mirror 181 and the second mirror 182 and incident upon the scale 110 (L5, L6).

In this case, the light (L1) emitted from the light source portion 140 is incident upon the wave guide mirror 161 by the polarizing angle 45°. When the reflected light (L2) reflected on the wave guide mirror 161 is divided by the polarization beam splitter 170, P-wave (L4) is transmitted and S-wave is reflected. Further, this S-wave is changed into P-wave (L3) by the ½ wave length plate 175A. Since only P-wave is transmitted through the cover glass member 162, two beams of light (L3, L4) sent form the polarizing means splitter 170 are filtered and only P-wave is illuminated onto the scale 110.

The diffracted light (L7, L8) of the degree of −1, which is generated when this incident light (L5, L6) is reflected and diffracted on the scale 110, is retroreflected by the first and the second corner cube 191, 192 and incident again upon the scale 110 (L9, L10). The light (L11, L12), which is generated when this retroreflected light (L9, L10) is reflected and diffracted on the scale 110, is reflected (L13, L14) on the first and the second mirror 181, 182 and synthesized by the polarization beam splitter 170.

In this case, a metallic thin film (for example, a thin film of aluminum) having the polarizing characteristic is vapor-deposited on the diffraction grating 111 of the scale 110. Further, a metallic film (for example, a film of silver) having the polarizing characteristic is vapor-deposited on the inside of the first and the second corner cube 191, 192. Therefore, when the light is reflected on the scale 110 and the corner cubes 191, 192, the polarizing direction of the light is not changed, that is the polarizing direction of the light is maintained as it is. Therefore, when two beams of light (L5, L6) incident upon the scale 110 is P-wave, the light (L13, L14) returning to the polarization beam splitter is maintained to be P-wave as it is.

The polarizing direction of one (L13) of the beams of light (L13, L14) reflected on the reflection mirror 181 and sent to the polarization beam splitter 170 is rotated by the ½ wave length plate 175A and the light is changed from P-wave to S-wave. Accordingly, all beams of light are reflected on the polarization beam splitter 170. Concerning the other beam of light (L14), although the length of the optical path is adjusted via the transparent medium 175B, the polarizing direction is not changed, and the beam of light is incident upon the polarization beam splitter 170 while the light is being maintained in the form of P-wave. Then, the beam of light is transmitted through the polarization beam splitter 170. That is, two beams of light reflected and diffracted on the scale 110 are synthesized by the polarization beam splitter 170 and formed into the light (L15) proceeding in the same direction.

Concerning the beams of light (L15) synthesized by the polarization beam splitter 170, one is S-wave and the other is P-wave. When the beams of light are reflected on the wave-guide mirror 161 and the polarizing direction is rotated by the ½ wave-length plate 163, the yawing directions of two beams of light are respectively rotated by 45°. Therefore, the light (L15) is changed into the light (L16) of 45°-polarization and 135°-polarization and incident upon the light receiving portion 150.

In the light receiving portion 150, the beam of light (L16) sent from the wave guide mirror 161 is first divided by the non-polarization beam splitter 152 (L17, L18). One (L17) of the divided beams of light is further divided by the polarization beam splitter 153 (L19, L20). At this time, in the beam of light incident upon the light receiving portion 150 from the wave-guide mirror 161, the light wave of 45°-polarization and the light wave of 135°-polarization are synthesized with each other. Therefore, when the beam of light is divided by the polarization beam splitter 153 to the transmitting light (L19) and the reflected light (L20), these beams of light interfere with each other. Therefore, the phase difference of 180° is caused between the transmitting light (L19) and the reflected light (L20).

Two beams of light having the phase difference of 180° are respectively received by the photo diodes 156A, 156B. Therefore, for example, when a sine signal (Sin) is obtained by the photo diode 156A, a negative sine signal (−Sin) is obtained by the photo diode 156B.

Concerning the other beam of light (L18) divided by the non-polarization beam splitter 152, the yawing direction is rotated by the phase retardation plate (½ wave-length plate) 155 by 90°, the beam of light is divided (L21, L22) by the polarization beam splitter 154, and the respective beams of light are received by the photo diodes 156C, 156D. When the light is divided to the transmitting light (L21) and the reflected light (L22) by the polarization beam splitter 154, two beams of light interfere with each other, and the phase difference of 180° is made between the transmitting light and the reflected light. When a cosine (Cos) signal is obtained by the photo diode 156C, a negative cosine signal (–Cos) is obtained by the photo diode 156D.

Signals sent from the photo diode 156A and the photo diode 156B are differentially amplified, and signals sent from the photo diode 156C and the photo diode 156D are differentially amplified. Lissajous's figure is drawn from these two signals differentially amplified. By a change in this Lissajous's figure, a relative displacement between the scale 110 and the detection head portion 120 can be detected.

Next, the action conducted by the above constitution will be explained below.

The incident angle α of the incident light (L5, L6), which is incident upon the scale 110 after the reflection on the first and the second mirror 181, 182, is 62°, which is larger than the diffraction angle (45°) of the diffracted light of the degree of –1. Therefore, a change in the diffraction angle caused by the yawing of the scale 110 is reduced.

Since the incident angle α of the incident light (L5, L6) upon the scale 110 is 62°, it is possible to obtain the diffracted light (L7, L8), the diffraction intensity of which is sufficiently high, in the diffraction made by the diffraction grating 111.

Figure 3:
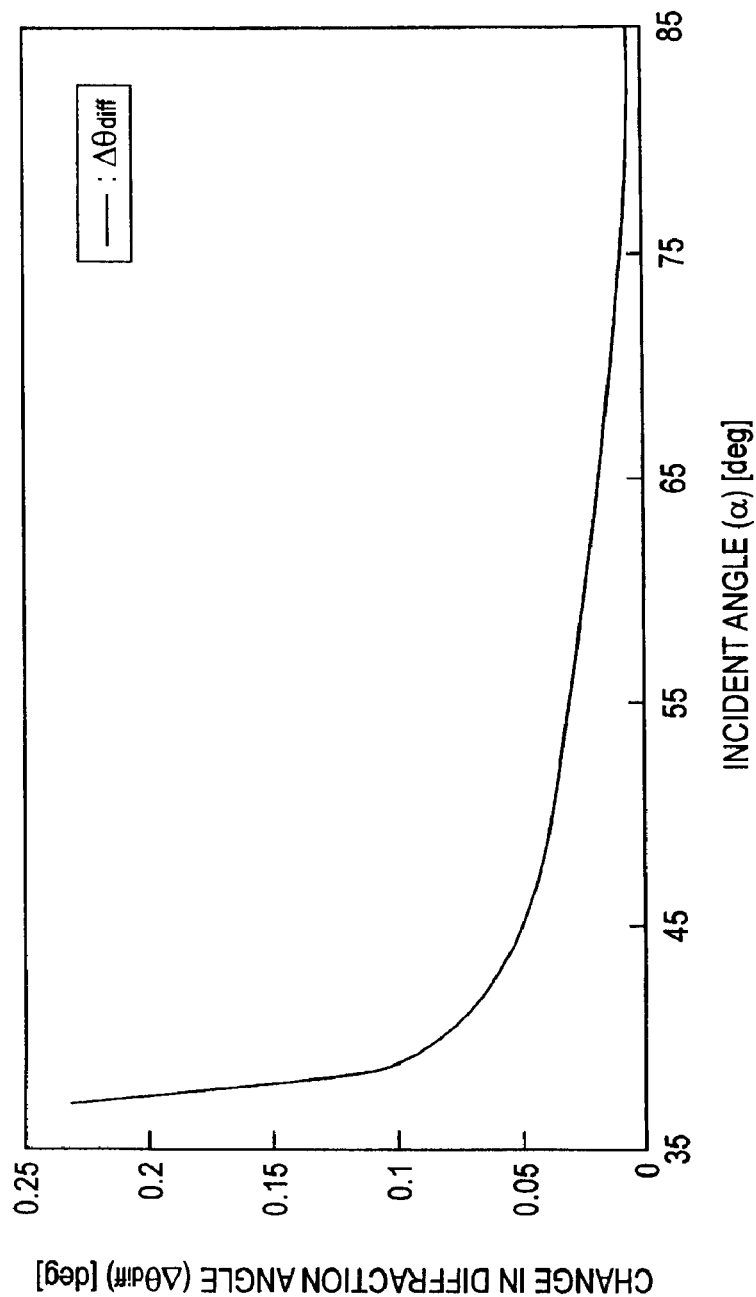
FIG. 3 is a graph in which the axis of abscissa represents an incident angle upon the scale, and the axis of ordinate represents a diffraction angle change ($\Delta\theta$diff) in the case where the scale is yawed (the yawing angle 2') under the condition that light is incident by a certain incident angle.
Figure 4:
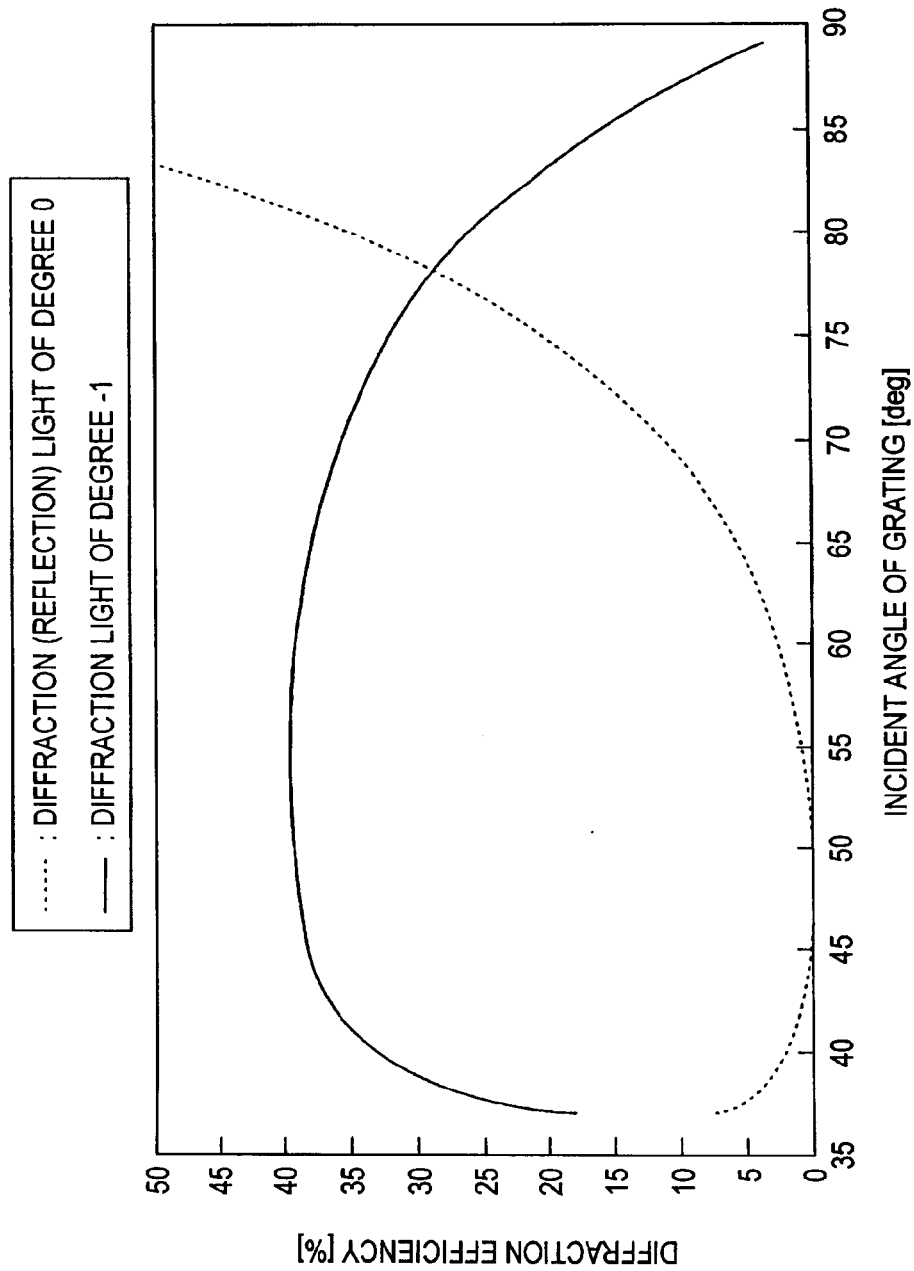
FIG. 4 is a graph in which the axis of abscissa represents an incident angle upon the scale, and the axis of ordinate represents a diffraction efficiency at a certain incident angle.

Referring to FIGS. 3 and 4, these points will be explained below.

FIG. 3 is a graph in which the axis of abscissa represents an incident angle (α) upon the scale, and the axis of ordinate represents a diffraction angle change (Δθdiff) in the case where the scale is yawed (the yawing angle 2') under the condition that light is incident by a certain incident angle (α).

From FIG. 3, it can be understood that when the incident angle is large, the diffraction angle change caused by the yawing of the scale 110 is reduced.

For example, in FIG. 1, in the case where the diffracted light of the incident light L6 is represented by L8 when the scale 110 is in the normal posture and the diffracted light of the incident light L6 is represented by L8' when the scale 110 is yawed, it is possible to reduce a shift between L8 and L8' by increasing the incident angle α. In this connection, in FIG. 1, L8' is illustrated being greatly shifted for the convenience of explanations.

In FIG. 4, the axis of abscissa represents an incident angle (α) upon the scale 110, and the axis of ordinate represents a diffraction efficiency at a certain incident angle.

The following can be understood from FIG. 4. When the incident angle is in the range from 45° to 70°, the diffraction efficiency is sufficiently high. Therefore, it is possible to obtain a high intensity of diffracted light. However, when the incident angle exceeds 70°, the diffraction efficiency is reduced. Therefore, an intensity of the diffracted light is decreased.

From the data shown in FIGS. 3 and 4, the following can be understood. When the incident angle is approximately 70°, a change in the diffraction angle caused by the yawing of the scale 110 can be suppressed and further it is possible to obtain a sufficiently high intensity of diffracted light. At this viewpoint, since the incident angle α is 62° in this embodiment, a change in the diffraction angle caused by the yawing of the scale 110 is sufficiently reduced and the diffraction intensity is sufficiently increased.

As described above, since a change in the diffraction angle caused by the yawing of the scale is reduced, even when the scale 110 is yawed a little, a difference between the optical path length in the direction of +x and the optical path length in the direction of –x is reduced. That is, the interference light is not changed only by the small yawing of the scale 110. Therefore, a relative displacement between the scale 110 and the detection head portion 120 can be highly accurately detected.

Since a change in the diffraction angle caused by the yawing of the scale 110 is reduced, the diffracted light can be accurately synthesized by the beam splitter 170, and a sufficiently high intensity of interference light can be received by the light receiving portion 150. That is, even when the scale is yawed, an intensity level of the light receiving signal can be maintained by the interference light, a highly accurate analysis can be made and the detection accuracy can be maintained.

Since the diffraction efficiency of the diffracted light at the diffraction grating 111 is sufficiently high, a level of the light receiving signal can be enhanced by the interference light and the detection accuracy can be enhanced.

The above displacement detector can provide the following effects.

(1) Since the reflection mirrors 181, 182 are arranged on the scale 110 side, the incident angle α of the incident light L5, L6 can be increased. As a result, a change in the diffraction angle caused by the yawing of the scale 110 can be reduced. That is, since a change in the optical path length caused by the yawing of the scale 110 can be reduced, the detection accuracy can be stabilized even when the scale 110 is yawed.

(2) Since the reflection mirrors 181, 182 and the corner cubes 191, 192 are arranged on a face perpendicular to the diffraction grating groove, the reflection mirror 181 and the corner cubes 191, 192 are arranged on the same face. Accordingly, the width of the detection head portion 120 can be reduced. For example, the detection head portion 120 can be housed in the width of the scale 110. Then, the thickness of the displacement detector 100 can be reduced, that is, the displacement detector 100 can be made compact.

(3) Since the yawing direction of light can be appropriately controlled by the ½ wave-length plate 175A, the thin metallic film of the diffraction grating 111 and the metallic film of the corner cube 191, 192, when two beams of light reflected and diffracted by the scale 110 are synthesized by the polarization beam splitter 170, all the beams of light proceed in the same direction. As a result, a loss of the quantity of light is seldom generated. Accordingly, the detection accuracy can be enhanced when a quantity of received light is increased to the maximum in the photo diodes 156A to 156D. As a result, the electric power consumption can be reduced. Since the cover glass member 162 functioning as the Brewster window is provided, it is possible to put the polarizing direction of light incident on the scale 110 in order. As a result, the detecting accuracy can be enhanced.

Second Embodiment

Next, the second embodiment of the displacement detector of the present invention will be explained referring to FIGS. 5 and 6.

The fundamental structure of the second embodiment is the same as that of the first embodiment. However, concerning the control of the polarizing direction of light, there is a small difference between the first and the second embodiment. Therefore, this point will be mainly explained as follows.

Figure 5:
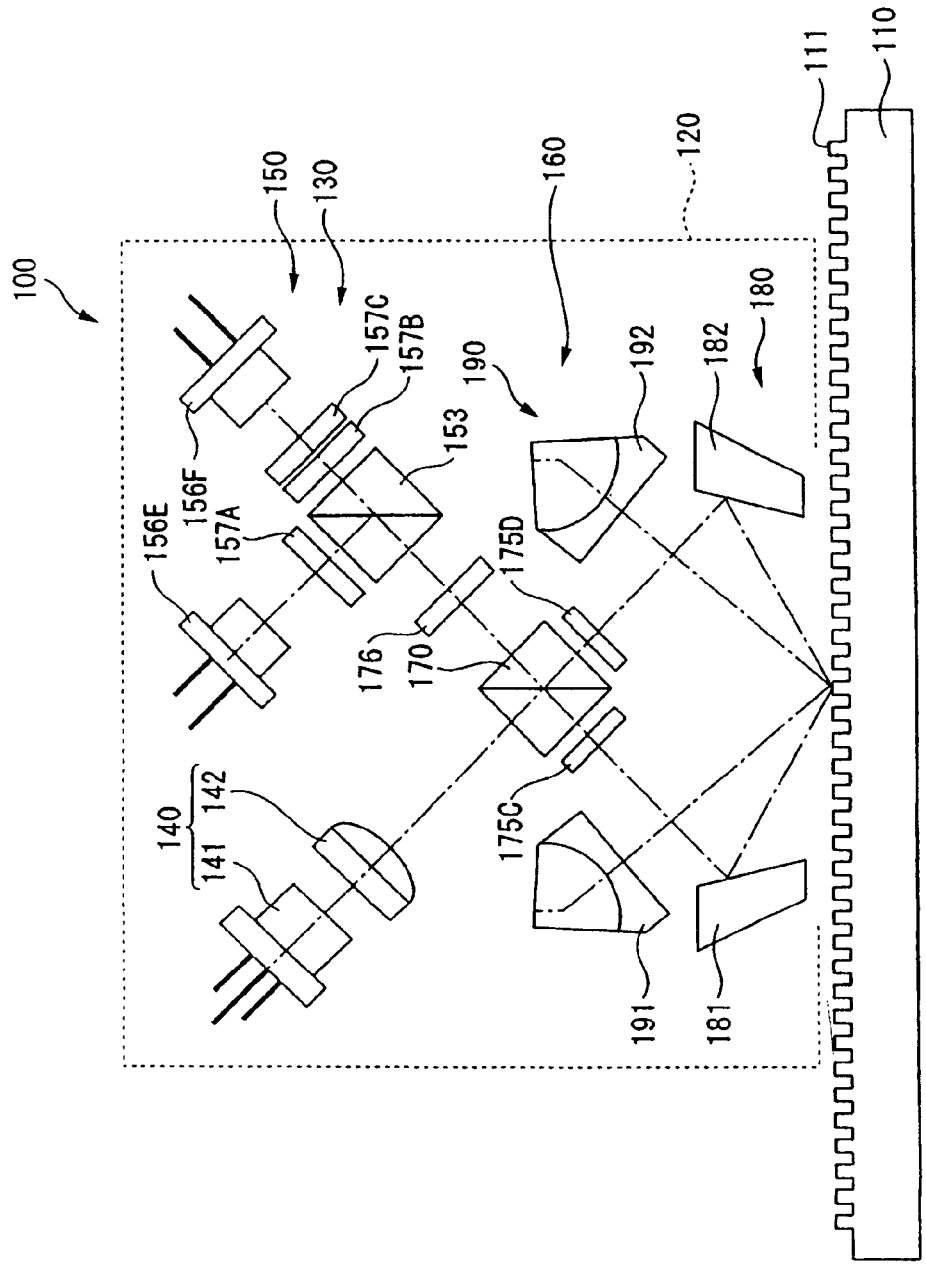
FIG. 5 is a view showing a structure of the second embodiment of the displacement detector of the present invention.

FIG. 5 is a side view showing the second embodiment.

In FIG. 5, the light source portion 140 directly emits a beam of polarization light to the polarization beam splitter 170 by the oblique angle 45°. Between the polarization beam splitter 170 and the reflection mirror portion 180 (the first reflection mirror 181 and the second reflection mirror 182), the ½ wave-length plates 175C, 175D are arranged.

Figure 6:
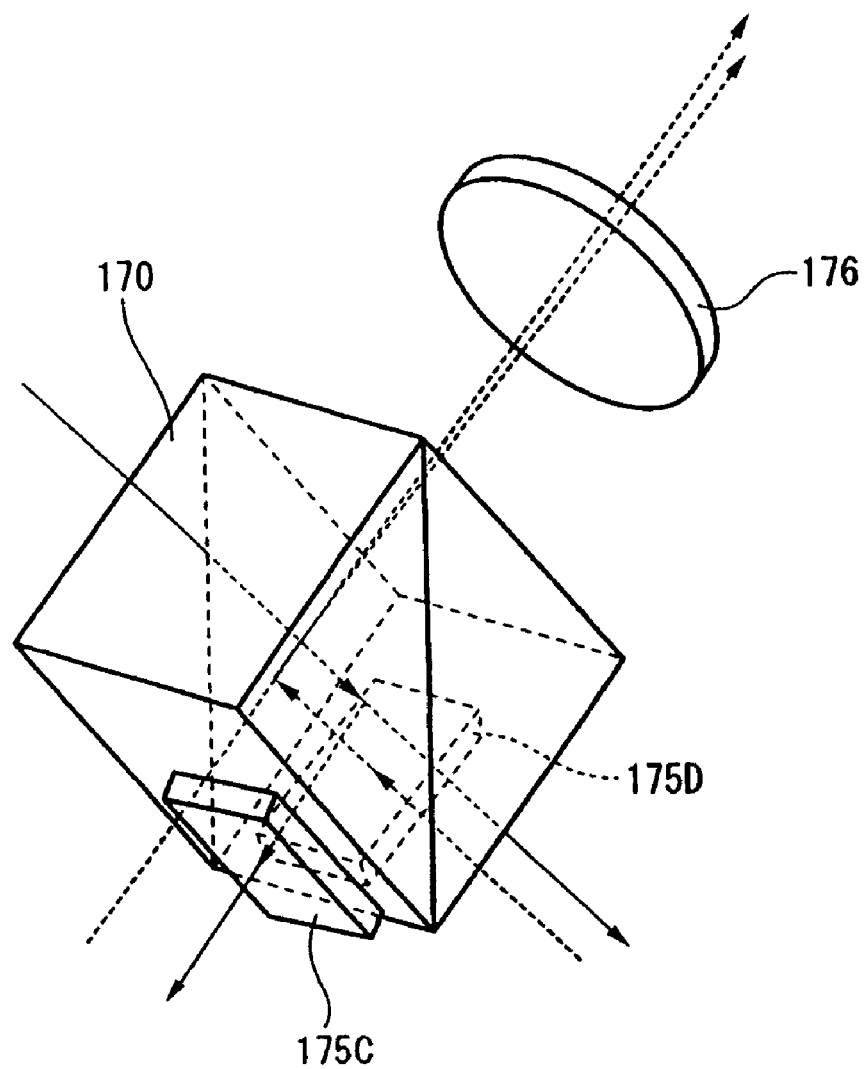
FIG. 6 is a perspective view showing a positional relation between the polarization beam splitter and two phase retardation plates in the second embodiment.

A positional relation between the polarization beam splitter 170 and the ½ wave-length plates 175C, 175D is shown in the perspective view of FIG. 6.

The ½ wave-length plate 175C rotates the yawing direction of S-wave, which is made in such a manner that the light of the light source portion 140 is divided by the polarization beam splitter 170 into two beams of light and one of the two beams of light is reflected by the polarization beam splitter 170, by the angle of 90°, and the thus obtained P-wave is emitted. However, the width (the length of depth) of the ½ wave-length plate 175C is so short that the reflected and diffracted light sent from the scale 110 can not pass through the ½ wave-length plate 175C.

P-wave, which is transmitted through the polarization beam splitter 170 in two beams of light generated when the light sent from the light source portion 140 is divided by the polarization beam splitter 170, is emitted without passing through the ½ wave-length plate 175D. However, in the passage in which P-wave is returned being reflected and diffracted by the scale 110, P-wave passes through the ½ wave-length plate 175D and becomes S-wave.

In FIG. 5, the ½ wave-length plate 176 is inserted between the polarization beam splitter 170 and the light receiving portion 150.

The light receiving portion 150 includes: a polarization beam splitter 153; and photo diodes 156E, 156F. The polarization beam splitter 153 divides the light, which has been synthesized by the polarization beam splitter 170, into two beams of light. The photo diodes 156E, 156F receives the respective beams of light divided by the polarization beam splitter 153 and for outputting the light receiving signals.

The polarizing plate 157A is arranged between the polarization beam splitter 153 and the photo diode 156E, and the ½ wave-length plate 157B and the polarizing plate 157C are arranged between the polarization beam splitter 153 and the photo diode 156F.

In this constitution, the 45°-polarization light is emitted from the light source portion 140. This light is divided into P-wave, which is a beam of transmitting light, and S-wave, which is a beam of reflected light, by the polarization beam splitter 170. Further, the polarizing direction of S-wave, which is a beam of reflected light, is rotated by the ½ wave-length plate 175C and changed into P-wave.

As described above, two P-waves are reflected or diffracted by the reflection mirrors 181, 182, the scale 110 and the corner cubes 191, 192. This point is the same as that of the first embodiment described before.

Two beams of light are returned from the reflection mirrors 181, 182 to the polarization beam splitter 170. One of them is transmitted through the polarization beam splitter 170 in the form of P-wave without passing through the ½ wave-length plate 175C. The other is changed into S-wave when the polarizing direction is rotated by the ½ wave-length plate 175D, and the thus formed S-wave is reflected by the polarization beam splitter 170 as shown in FIG. 6.

That is, the proceeding directions of the two beams of light returning from the reflection mirrors 181, 182 are made to be the same by the polarization beam splitter 170.

P-wave and S-wave are sent from the polarization beam splitter 170. These waves are rotated by the ½ wave-length plate 176, and 45°-polarization light and 135°-polarization light are incident upon the light receiving portion 150.

First of all, when incident light is divided by the polarization beam splitter 153 in the light receiving portion 150, polarization light of 45° and polarization light of 135° interfere with each other, and the incident light is divided into two beams of light, wherein one is a beam of transmitting light and the other is a beam of reflected light, the phase difference of which is 180°.

Reflected light sent from the polarization beam splitter 153 is received by the photo diode 156E via the polarizing plate 157A, and transmitting light sent from the polarization beam splitter 153 is received by the photo diode 156F via ½ wave-length plate 157B and the polarizing plate 157C. At this time, the phase of light received by the photo diode 156E and the phase of light received by the photo diode 156F are different from each other by 90°. Therefore, the photo diode 156E is capable of receiving a light receiving signal of sine and the photo diode 156F is capable of receiving a light receiving signal of cosine. In a predetermined signal analysis section, Lissajours' figure is generated from the light receiving signals sent from the photo diode 156E and the photo diode 156F. By the change in Lissajours' figure, a relative displacement between the scale 110 and the detection head 120 can be detected.

As described above, according to the second embodiment, the same operation effect as that of the first embodiment can be exhibited.

Figure 7:
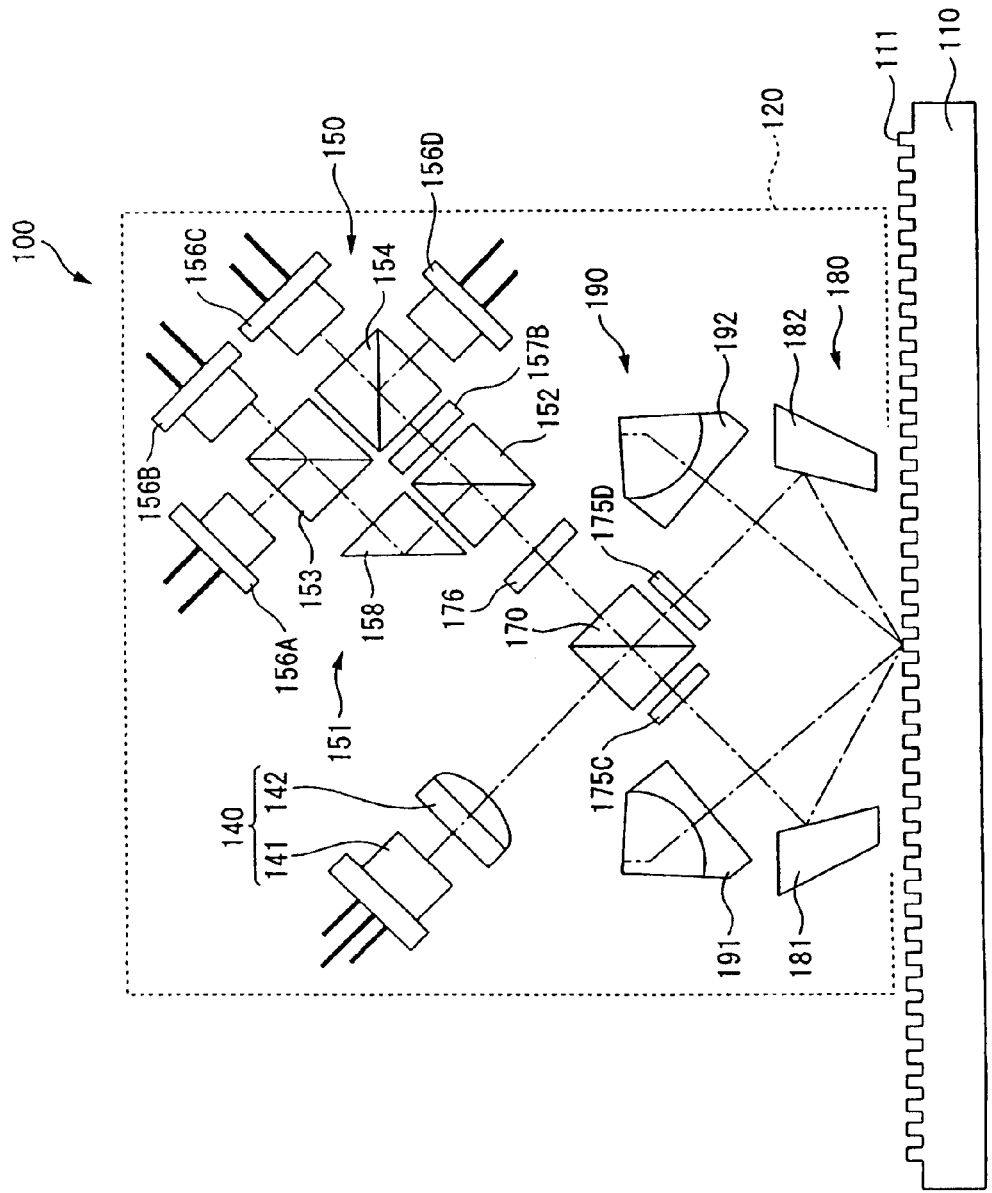
FIG. 7 is a view showing a modified example in which the arrangement of the light receiving portion of the second embodiment is changed.

In this case, in the second embodiment described above, the light receiving portion 150 obtains two phase signals, the phase difference between which is 90°. However, for example, it is possible to adopt the structure in which four phase signals are obtained as shown in FIG. 7. The structure of the light receiving portion 150 shown in FIG. 7 is fundamentally the same as that of the light receiving portion 150 of the first embodiment except for the point that the mirror 158 is provided in the structure shown in FIG. 7.

Third Embodiment

Next, referring to FIG. 8, the third embodiment of the present invention will be explained below.

The fundamental structure of the third embodiment is the same as that of the second embodiment. A different point is that the beam splitter arranged in the third embodiment is the non-polarization beam splitter 171.

Figure 8:
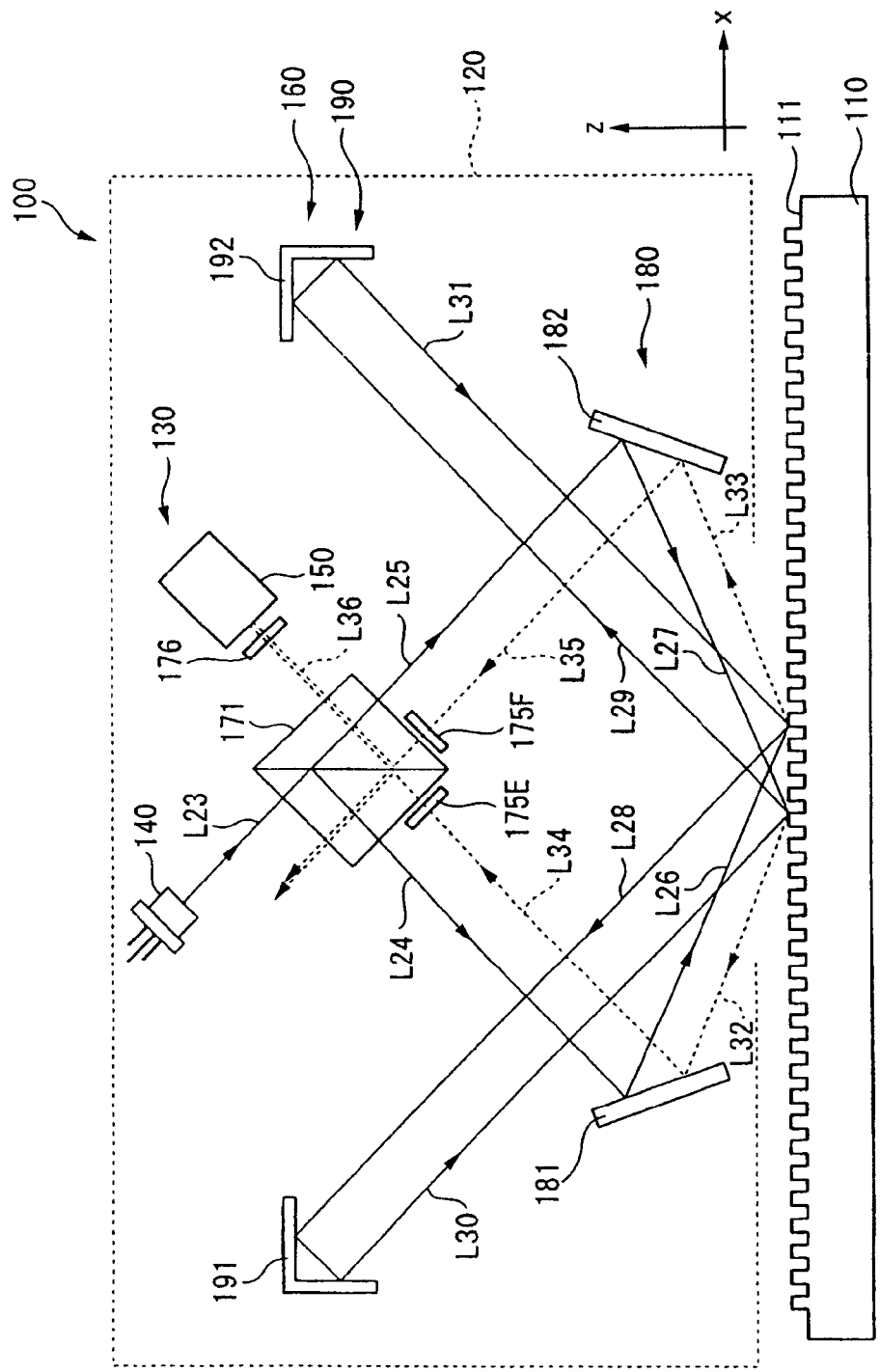
FIG. 8 is an arrangement view of the third embodiment of the displacement detector of the present invention.

In FIG. 8, the light source portion 140 directly emits P-wave (L23) obliquely by the angle 45° to the non-polarization beam splitter 171.

Two phase retardation plates (175E, 175F) are provided between the non-polarization beam splitter 171 and the reflection mirrors (the first reflection mirror 181 and the second reflection mirror 182).

Concerning the phase retardation plate, ½ wave-length plate 175E and the transparent medium 175F, the refractive index of which is the same as that of ½ wave-length plate 175E, for making the optical path lengths of two beams of light agree with each other are provided.

Figure 9:
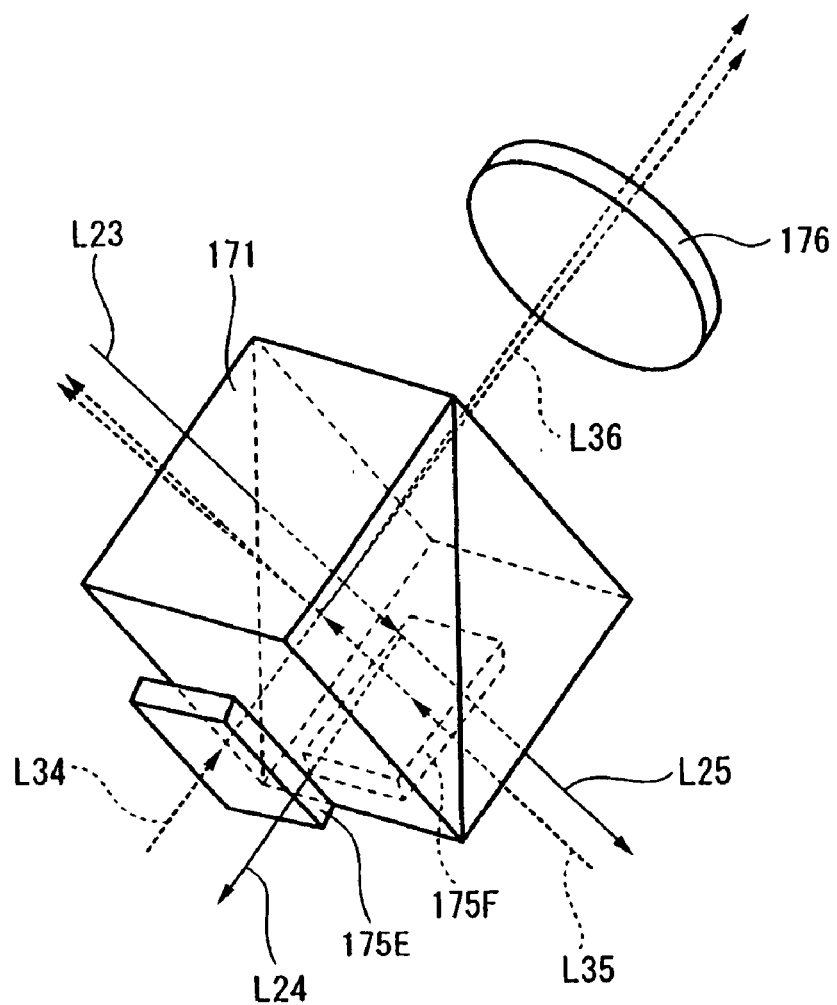
FIG. 9 is a perspective view showing a positional relation between the polarization beam splitter and two phase retardation plates in the third embodiment.

FIG. 9 is a perspective view showing a positional relation between the non-polarization beam splitter 171 and the phase retardation plates 175E, 175F.

Light (L23) incident upon the non-polarization beam splitter 171 by the light source portion 140 is divided into two beams of light (L24, L25). Both of the two beams of light (L24, L25) sent from the non-polarization beam splitter 171 are emitted without passing through ½ wave-length plates 175E, 175F and proceed to the reflection mirrors 181, 182 and the scale 110.

Two beams of light (L34, L35) are returned from the reflection mirrors 181, 182 to the non-polarization beam splitter 171. One beam of light (L34) is rotated by ½ wave-length plate 175E and changed into S-wave. In this connection, when the other (L35) of the two beams of light (L34, L35) are returned from the reflection mirrors 181, 182 to the non-polarization beam splitter 171 is transmitted through the transparent medium 175F, the optical path lengths of the two beams of light can be adjusted to be equal to each other.

The ½ wave-length plate 176 is arranged between the non-polarization beam splitter 171 and the light receiving portion 150.

In this connection, the structure of the light receiving portion 150 may be the same as that of the light receiving portion 150 of the first or the second embodiment.

In this structure, light (L23) sent from the light source portion 140 is P-wave and divided into two beams of light (L23, L25) by the non-polarization beam splitter 171. Therefore, two beams of light, which are P-waves, are emitted from the non-polarization beam splitter 171. These two P-waves (L24, L25) are reflected or diffracted by the corner cubes 191, 192, which is the same as the first embodiment.

One beam of light (L34) of the two beams of light (L34, L35), which are returned from the reflection mirrors 181, 182 to the non-polarization beam splitter 171, is rotated by ½ wave-length plate 175E by 90° and changed into S-wave.

P-wave and S-wave returned to the non-polarization beam splitter 171 are respectively divided by the non-polarization beam splitter 171. One beam of light (L36) of the two beams of light, which is obtained when light is divided by the non-polarization beam splitter 171, passes through ½ wave-length plate 176 and is changed into polarization light of 45° and polarization light of 135° and incident upon the light receiving portion 150. In the light receiving portion 150, light is received in the same manner as that explained in the first or the second embodiment. By the signal obtained when light is received, a relative displacement between the scale 110 and the detection head portion 120 can be detected.

The same operational effect as that of the first embodiment can be provided by this third embodiment.

Modified Embodiment 1

Next, referring to FIG. 10, Modified Embodiment 1 of the displacement detector of the present invention will be explained below.

Although the fundamental structure of Modified Embodiment 1 is the same as that of the third embodiment, Modified Embodiment 1 is characterized in that the corner cubes (the retroreflector) are arranged closer to the scale 110.

Figure 10:
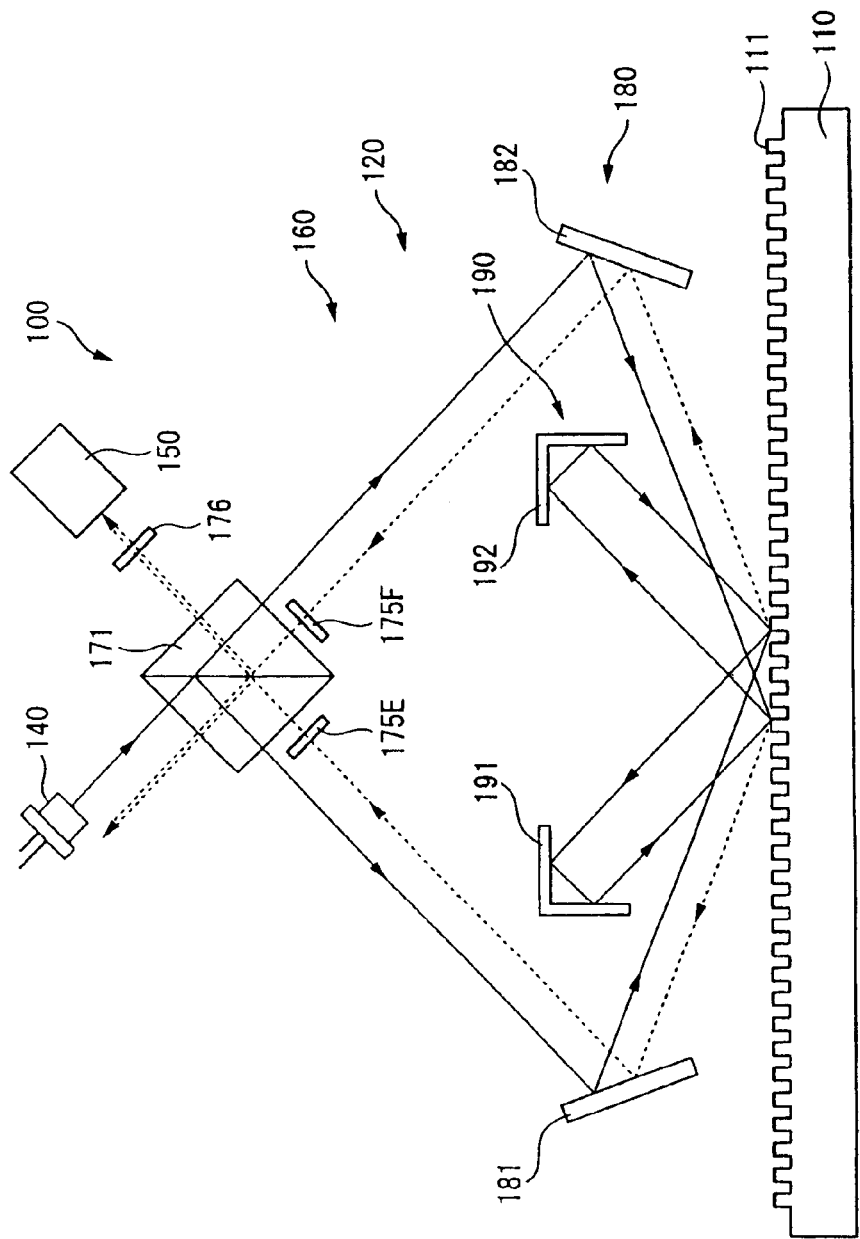
FIG. 10 is a view showing Modified Embodiment 1 of the displacement detector of the present invention.
Figure 11:
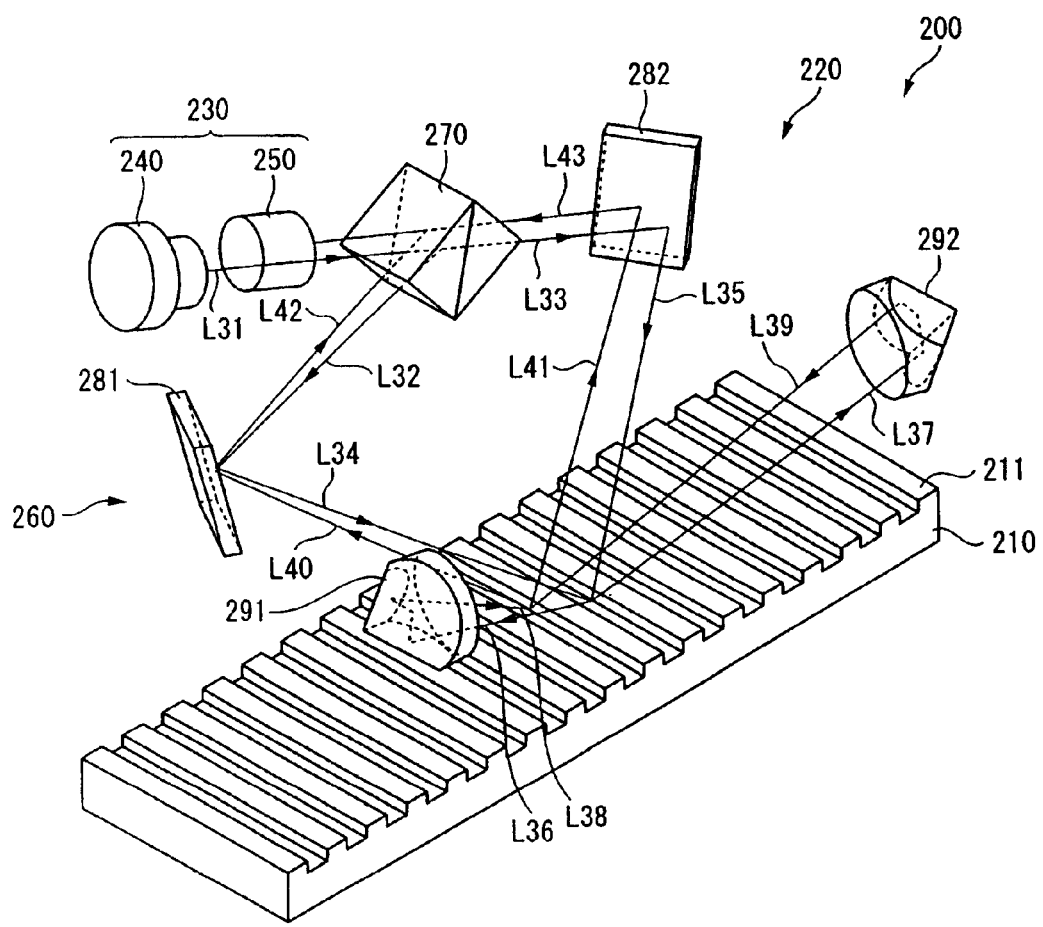
FIG. 11 is an arrangement view of the related-art displacement detector.
Figure 12:
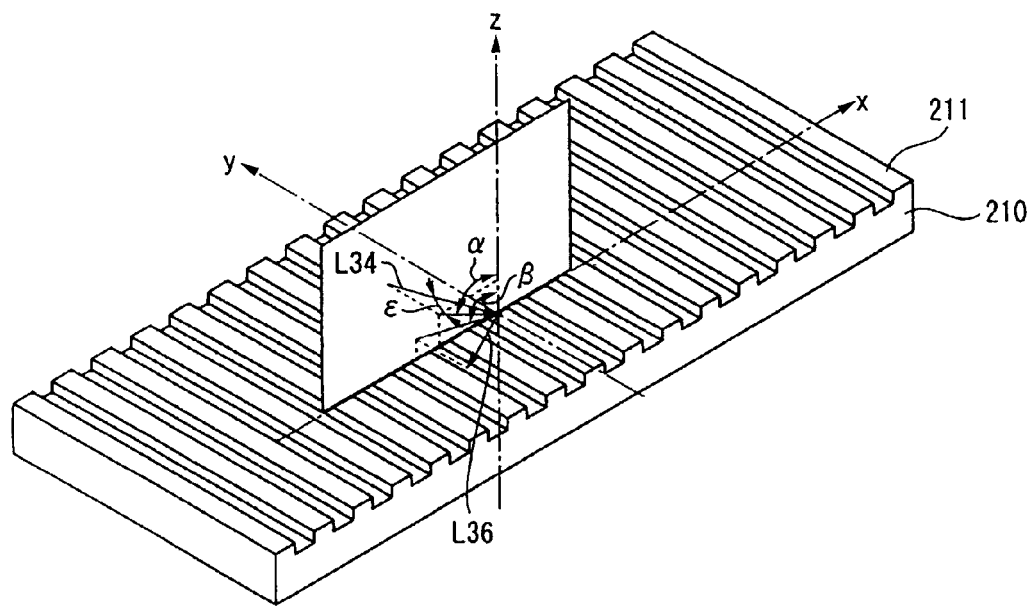
FIG. 12 is a view showing a relation among the incident angle, conical angle and diffraction angle in the related-art displacement detector.
Figure 13:
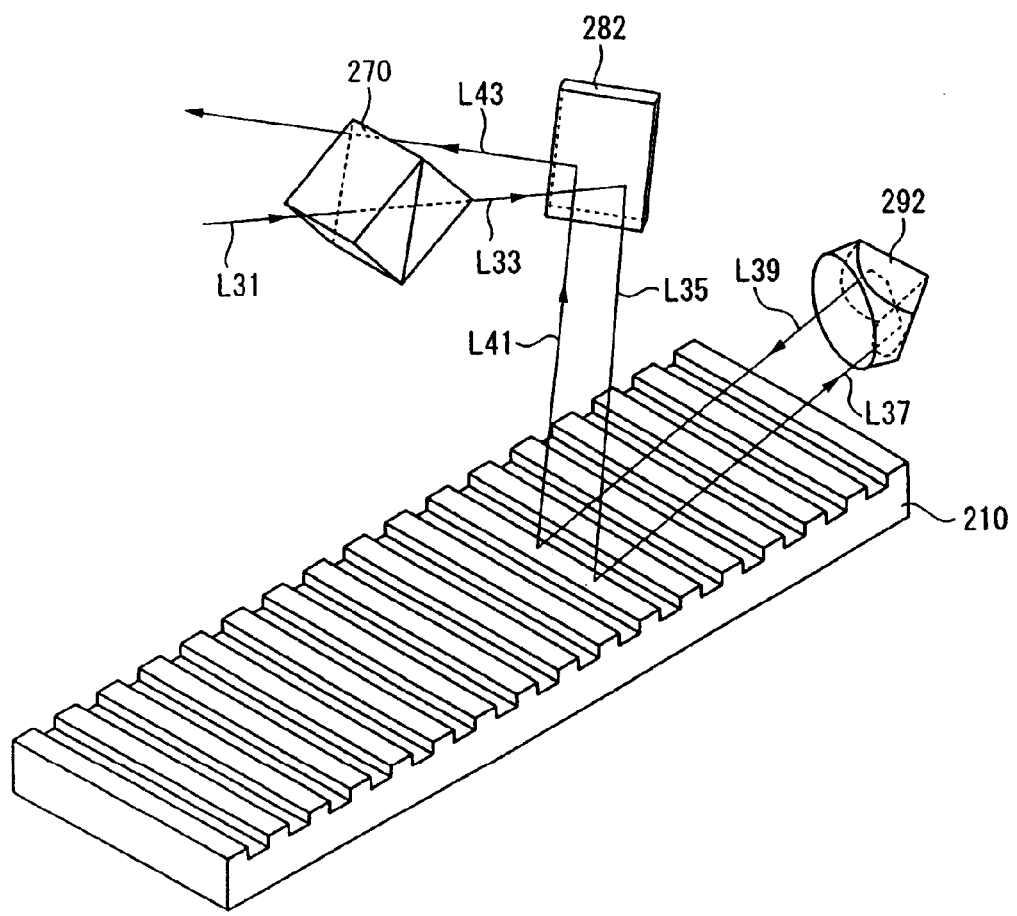
FIG. 13 is a view showing circumstances in which the optical path is shifted by the yawing of the scale in the related-art displacement detector.

As shown in FIG. 10, the corner cubes 191, 192 are arranged closer to the scale 110 than the first to the third embodiment. Specifically, the corner cubes 191, 192 are arranged closer to the scale 110 side than the straight line connecting the beam splitter 171 to the reflection mirror portion 180 (the first reflection mirror 181 and the second reflection mirror 182).

When the corner cubes 191, 192 are arranged closer to the scale 110, it is possible to reduce the optical path length. Then, even when a small change in the diffraction angle is caused by the yawning of the scale, a difference between the optical path lengths of two beams of light can be reduced. As a result, even when yawning is caused in the scale 110, a relative displacement between the scale 110 and the detection head portion 120 can be highly accurately detected.

In this connection, it should be noted that the present invention is not limited to the above specific embodiment. Variations and improvements capable of accomplishing the above object of the present invention are included in the present invention.

In the embodiment explained above, the scale includes a reflection type diffraction grating. However, the scale may include a transmission type diffraction grating. In the case of using the transmission type diffraction grating, the reflection mirror and the corner cubes are arranged on the opposite side to each other with respect to the front face and the reverse face of the scale, however, other points are fundamentally the same. Even in the case of the transmission type diffraction grating, when incident light is incident upon the diffraction grating groove in the vertical direction and the incident angel of the incident light is made large, it is possible to reduce a change in the diffraction angle caused by the yawing of the scale. Even if yawing is caused in the scale, it is possible to highly accurately detect a relative displacement between the scale and the detection head portion.

Since the reflection mirror and the corner cubes may be arranged on the front side and the reverse side of the scale, the reflection mirror and the corner cubes do not interfere with each other in the arrangement. Therefore, every component can be easily laid out in the structure.

In the above embodiment, explanations are made into the structure in which the diffracted light, which is obtained when the incident light is diffracted, is retroreflected by the corner cubes. However, the diffracted light may not be retroreflected by the corner cubes but the light may be received when the diffracted light, which is generated when the incident light is diffracted, is made to interfere. Even in this case, when the incident angle of the incident light is made large, it is possible to reduce a change in the diffraction angle of the diffracted light. Therefore, the displacement detection accuracy can be enhanced irrespective of the yawing of the scale.

Of course, the pitch of the diffraction grating and the wavelength of the laser beam are not limited to the above specific embodiment but may be appropriately changed. Of course, the incident angle of the incident light from the reflection mirrors 181, 182 upon the scale 110 may be appropriately changed. In the explanations of the above embodiment, the incident angle is 62° and the diffraction angle is 45°. However, it should be noted that the present invention is not limited to the above specific embodiment. An excellent result can be provided as long as the incident angle is larger than the diffraction angle. The incident angle may be 60° to 75° and the diffraction angle may be 40° to 45°. For example, when the wave-length $\lambda$ and the grating period satisfy the expression $\lambda \approx 1.63$ P, the incident angle may be 60° to 75°, and the diffraction angle can be 40° to 45°. Due to the foregoing, it is possible to suppress a change in the diffraction angle caused by the yawing of the scale 110, and the diffraction efficiency can be maintained.

Although the retroreflector uses corner cubes in the above example, of course, the retroreflector may use reflection mirrors.

Further, the optical element is not limited to a reflection mirror. The optical element may be a diffraction grating.

In the above embodiment, explanations are made into an example in which the scale slides with respect to the detection head portion. However, of course, the detection head may be slid with respect to the scale.

In the above first embodiment, explanations are made into an example in which the polarizing direction is rotated when the light sent from the polarization beam splitter 170 is made to pass through ½ wave-length plate 163 before it is incident upon the light receiving portion 150. However, when the light receiving portion 150 is three-dimensionally arranged in such a manner that the light receiving portion 150 is arranged in the direction perpendicular to the surface of the drawing (FIG. 1) with respect to the wave guide mirror 161, even if ½ wavelength plate 163 is not provided, the polarizing direction of the reflected light on the wave-guide mirror 161 can be rotated by 45°. Due to the foregoing, the number of parts can be decreased. Accordingly, the parts cost and the assembling cost can be reduced.

The present invention can be applied to an optical type displacement detector.

We claim:

1. A displacement detector comprising: a scale having a diffraction grating; and a detection head, which is arranged being capable of relatively moving with respect to the scale, emitting interference light to the scale and receiving diffracted light sent from the scale, the detection head including:

a light source emitting the interference light;

a light dividing section for dividing light, which has been sent from the light source, into two beams of light;

an optical element, which is arranged for each of the two beams of light sent from the light dividing section, for reflecting the beam of light sent from the light dividing section and making the beam of light be incident upon the scale as incident light; and a retroreflector, which is arranged for each of the beams of diffracted light generated when the two beams of light incident upon the scale are diffracted by the diffraction grating, for retroreflecting the diffracted light and making the light be incident upon the scale as retroreflected light, wherein the incident light and the retroreflected light are incident in a direction perpendicular to a diffraction grating groove, and an angle formed between the incident light and the normal line vector of the scale is larger than an angle formed between the retroreflected light and the normal line vector of the scale.

2. A displacement detector according to claim 1, wherein the scale includes a reflection type diffraction grating, the optical element and the retroreflector are arranged on a face perpendicular to the diffraction grating groove, and the optical element is arranged on a closer side to the scale than the retroreflector.

3. A displacement detector according to claim 2, wherein the light dividing section is a polarization beam splitter, one portion of the incident light, which is polarized by 45° with respect to the polarizing direction of the polarization beam splitter, is transmitted through the polarization beam splitter, another portion of the incident light is reflected by the polarization beam splitter so that the light is divided into two beams of light respectively having the polarizing directions which are perpendicular to each other, the detection head portion includes a phase retardation plate on which under the condition that the polarizing direction of the light emitted from the light source and reflected on the polarization beam splitter is rotated, the light is incident upon the reflection type diffraction grating and the polarizing direction of the light, which is obtained when this incident light is reflected and diffracted by the reflection type diffraction grating, is rotated again so that the light can be made into polarization light substantially perpendicular to the polarizing direction of the polarization beam splitter, and the reflection type diffraction grating is composed of a thin metallic film having a polarization characteristic in which incident light is reflected and diffracted under the condition that the polarizing direction is maintained.

4. A displacement detector according to claim 3, wherein the detecting head portion includes a glass member arranged on a reflection face side of the reflection type diffraction grating.

5. A displacement detector according to claim 2, wherein the retroreflector is arranged closer to the scale side than the line connecting the light dividing section and the optical element.

* * * * *